United States Patent
Thoursie et al.

(12) 
(10) Patent No.: US 8,302,175 B2
(45) Date of Patent: Oct. 30, 2012

(54) METHOD AND SYSTEM FOR ELECTRONIC REAUTHENTICATION OF A COMMUNICATION PARTY

(75) Inventors: Anders Thoursie, Nacka (SE); Peter Holm, Sollentuna (SE); Sven-Håkan Olsson, Stockholm (SE)

(73) Assignee: DocAccount AB, Nacka (SE)

( * ) Notice: Subject to any disclaimer, the term of this patent is extended or adjusted under 35 U.S.C. 154(b) by 914 days.

(21) Appl. No.: 11/918,877

(22) PCT Filed: Apr. 20, 2005

(86) PCT No.: PCT/SE2005/000568
§ 371 (c)(1),
(2), (4) Date: Oct. 19, 2007

(87) PCT Pub. No.: WO2006/112761
PCT Pub. Date: Oct. 26, 2006

(65) Prior Publication Data
US 2009/0106829 A1 Apr. 23, 2009

(51) Int. Cl.
*G06F 7/04* (2006.01)

(52) U.S. Cl. .......................................... 726/9

(58) Field of Classification Search .................. 726/9
See application file for complete search history.

(56) References Cited

U.S. PATENT DOCUMENTS

| 5,588,051 | A | * | 12/1996 | Berkowitz et al. | 379/243 |
|---|---|---|---|---|---|
| 5,668,876 | A | * | 9/1997 | Falk et al. | 380/271 |
| 6,175,831 | B1 | * | 1/2001 | Weinreich et al. | 1/1 |
| 7,239,688 | B1 | * | 7/2007 | Sayko et al. | 379/93.02 |
| 2002/0004831 | A1 | | 1/2002 | Woodhill | |
| 2002/0169988 | A1 | * | 11/2002 | Vandergeest et al. | 713/201 |
| 2003/0159031 | A1 | | 8/2003 | Mueller et al. | |
| 2004/0243832 | A1 | * | 12/2004 | Wilf et al. | 713/200 |
| 2005/0215306 | A1 | * | 9/2005 | O'Donnell et al. | 463/17 |

FOREIGN PATENT DOCUMENTS

EP 1 102 150 5/2001

* cited by examiner

*Primary Examiner* — Cordelia Zecher
(74) *Attorney, Agent, or Firm* — Harness, Dickey & Pierce, P.L.C.

(57) ABSTRACT

The present invention relates to a method for electronic reauthentication of a communication party (12, 22). The method further relates to a device for electronic reauthentication of a communication party. A basic idea of the present invention is to have a communication party, which employs a service, state two different communication addresses, one being a telephone number, via which the communicating party may authenticate herself to a provider (11, 21) of the service.

41 Claims, 2 Drawing Sheets

FIG. 1

FIG. 2 ical Field of the Invention

METHOD AND SYSTEM FOR ELECTRONIC REAUTHENTICATION OF A COMMUNICATION PARTY

This application is a National Phase of PCT Application No. PCT/SE2005/000568 filed on Apr. 20, 2005, which claims priority under 35 U.S.C. §365(c).

TECHNICAL FIELD OF THE INVENTION

The present invention relates to a method for electronic reauthentication of a communication party. The method further relates to a device for electronic reauthentication of a communication party.

BACKGROUND ART

Today companies and organizations communicate with their customers and other parties via the Internet to an ever-increasing extent. In these situations, the companies and organizations need to ensure that a specific party is the same party they communicated with at an earlier occasion.

One way to ensure this is to provide the communication party with a code or a user name and password. If a person is able to replicate the code at a later occasion, this replication is considered to be an indication that it is the same person who previously received the code.

The use of codes or passwords as authenticating means has the disadvantage that there is a risk that an unauthorized person acquires these authenticating means. In today's society, people also need to learn and memorize codes to an ever-increasing extent, e.g. to use various services on the Internet or to use credit cards. This fact increases the risk that people will start to write down codes, making them easier for other people to acquire. It also makes these solutions less user-friendly, since it becomes considerably harder for people to remember all the codes. There is also a risk that so called brute force attacks or dictionary based attacks are used to find out and acquire passwords.

In many situations, code- or password-based solutions are hence considered insufficient. Instead, there is a need to introduce another mechanism which the communication party can control—which is more secure yet easy-to-use. Hence, the following features are desirable for such a mechanism:

The user is able to protect authenticating means, e.g. passwords, from being stolen.
A possible theft of authentication means is easily discovered.
The effect of a possible theft of authenticating means can be reduced, e.g. through a procedure of revoking the authenticating means.
It should be easy for companies to start using the mechanism on a wide basis, e.g. as a means for administering the communication with a great number of communication parties.
The mechanism should be easy-to-use and straightforward from a user perspective.

There are currently available solutions that meet these requirements to some degree. One example is the usage of card-based certificates, based on Public Key Infrastructure, PKI, as a tool for identification. A card-based certificate can be protected. A stolen certificate may easily be identified. If it is stolen, it may be revoked. However, the card-based technology requires an infrastructure that is not yet widely spread, as well as being relatively complex to implement to any greater extent.

An alternative is to use file-based certificates based on Public Key Infrastructure. These are more widely spread than card-based certificates, but are still by many considered not sufficiently spread and available to citizens and consumers.

SUMMARY OF THE INVENTION

An object of the invention is to alleviate the problems of prior art through providing a straightforward and easy-to-use method for electronic reauthentication.

This object is accomplished by a method of electronic reauthentication of a communication party in accordance with claim 1, and a device for electronic reauthentication of a communication party in accordance with claim 21.

According to a first aspect of the present invention, a method is provided of electronically reauthenticating a communication party. First, an association between a telephone communication address of the communication party, an additional communication address of the communication party and the communication party itself, which association serves as a basis for future authentication of the communication party, is created. Then, a request is received from a requesting communication party and it is verified that an association exists for the requesting communication party. A first confirmation token is distributed to the requesting communication party over a first communication channel and a second confirmation token is received from the requesting communication party over a second communication channel, wherein at least one of the first and the second channel is established by using the telephone communication address of the association for the requesting communication party. Thereafter, correspondence is verified between the first confirmation token and the second confirmation token. A third confirmation token is distributed over a third communication channel to the requesting communication party and a fourth confirmation token is received from the communication party over a fourth communication channel, wherein at least one of the third and the fourth channel is established by using the additional communication address of the association for the requesting communication party. Further, correspondence is verified between the third confirmation token and the fourth confirmation token, wherein the requesting communication party is considered to be authenticated.

If the request comprises a request to create an association for a further telephone communication address, a fifth confirmation token is distributed to the requesting communication party over a fifth communication channel and a sixth confirmation token is received from the requesting communication party over a sixth communication channel, wherein at least one of the fifth and the sixth channel is established by using said further telephone communication address of the request. Then, correspondence is verified between the fifth confirmation token and the sixth confirmation token and an association between said further telephone communication address of the requesting communication party, said additional communication address and the requesting communication party itself is created, which association serves as a basis for future authentication of the requesting communication party.

If the request comprises a request to create an association for a further additional communication address, a seventh confirmation token is distributed to the requesting communication party over a seventh communication channel and an eighth confirmation token is received from the requesting communication party receiving over an eighth communication channel, wherein at least one of the seventh and the eighth channel is established by using said further additional communication address of the request. Correspondence is verified between the seventh confirmation token and the eighth confirmation token and an association between said further additional communication address of the requesting communication party, said telephone communication address and the requesting communication party itself is created, which association serves as a basis for future authentication of the requesting communication party.

According to a second aspect of the present invention, a device is provided for electronic reauthentication of a communication party comprising means for creating an association between a telephone communication address of the communication party, an additional communication address of the communication party and the communication party itself, which association serves as a basis for future authentication of the communication party and means for storing the association. Further, the device comprises means for receiving a request from a requesting communication party, means for verifying that an association exists for the requesting communication party, means for distributing, over a first communication channel, a first confirmation token to the requesting communication party and means for receiving, over a second communication channel, a second confirmation token from the requesting communication party, wherein at least one of the first and the second channel is established by using the telephone communication address of the association for the requesting communication party. Moreover, the device comprises means for verifying correspondence between the first confirmation token and the second confirmation token, means for distributing, over a third communication channel, a third confirmation token to the requesting communication party, means for receiving, over a fourth communication channel, a fourth confirmation token from the communication party, wherein at least one of the third and the fourth channel is established by using the additional communication address of the association for the requesting communication party and means for verifying correspondence between the third confirmation token and the fourth confirmation token, wherein the requesting communication party is considered to be authenticated.

Further, the device comprises means for distributing, if the request comprises a request to create an association for a further telephone communication address, over a fifth communication channel, a fifth confirmation token to the requesting communication party, means for receiving, over a sixth communication channel, a sixth confirmation token from the requesting communication party, wherein at least one of the fifth and the sixth channel is established by using said further telephone communication address of the request, means for verifying correspondence between the fifth confirmation token and the sixth confirmation token, means for creating an association between said further telephone communication ad-dress of the requesting communication party, said additional communication address and the requesting communication party itself, which association serves as a basis for future authentication of the requesting communication party.

Finally, the device comprises means for distributing, if the request comprises a request to create an association for a further additional communication address, over a seventh communication channel, a seventh confirmation token to the requesting communication party, means for receiving, over an eighth communication channel, an eighth confirmation token from the requesting communication party, wherein at least one of the seventh and the eighth channel is established by using said further additional communication address of the request, means for verifying correspondence between the seventh confirmation token and the eighth confirmation token, means for creating an association between said further additional communication address of the requesting communication party, said telephone communication address and the requesting communication party itself, which association serves as a basis for future authentication of the requesting communication party.

A basic idea of the present invention is to have a communication party, which employs a service, state two different communication addresses, one being a telephone number, via which the communicating party may authenticate herself to a provider of the service.

A relation with the communication party, in the following referred to as a user, is established by confirming user control of the telephone communication address and an additional communication address. Initially, an association between the telephone communication address of the user, the additional communication address of the user and the user herself are created. When receiving a request from a user, which user not necessarily is the same as the user for which an association is created, it must be verified that an association exists for this requesting user. The confirmation of the requesting user's control of the telephone communication address of the association is made by distributing a first confirmation token over a first communication channel to the requesting user, receiving a second confirmation token over a second communication channel from the requesting user and then verifying that the two tokens are the same. At least one of the two communication channels should be established by means of using the telephone communication address of the association of the requesting user. In this way it is ensured that the requesting user is in control of the device which is designated by the telephone communication address. For instance, in case the telephone communication address is a telephone number, the requesting user shows, by sending a second token that is identical to the first token, that she actually is in possession of the telephone linked to the telephone number to which the first token was sent, and authentication of the requesting user is hence made.

To further strengthen authentication validity, confirmation of the requesting user's control of the additional communication address of the association is made by distributing a third confirmation token over a third communication channel to the requesting user, receiving a fourth confirmation token over a fourth communication channel from the requesting user and then verifying that the two tokens are the same. At least one of the two communication channels should be established by means of using the additional communication address of the association of the requesting user. In this way, it is ensured that the requesting user is in control of the means which is designated by the additional communication address. For instance, in case the additional communication address is an e-mail address, the requesting user shows, by sending a fourth token that is identical to the third token, that she actually is in possession of the e-mail account linked to the e-mail address to which the third token was sent, and authentication of the requesting user is hence made again.

The request of the user may for instance be to access an account which the user has at the service provider. The request may also be to create an association for a further telephone communication address and/or a further additional communication address. Alternatively, the request may comprise both an access request and an association request.

If the user request comprises a request to create an association for a further telephone communication address, a fifth confirmation token is distributed to the requesting user over a fifth communication channel and a sixth confirmation token is received from the requesting user over a sixth communication channel. Then, it is verified that the two tokens are the same. At least one of the two communication channels should be established by means of using the further telephone communication address of the request. In analogy with the description above, authentication is made, and an association between the further telephone communication address of the requesting communication party, the additional communication address and the requesting communication party itself is created, which association serves as a basis for future authentication of the requesting communication party.

Moreover, if the user request comprises a request to create an association for a further additional communication address, a seventh confirmation token is distributed to the requesting user over a seventh communication channel and an eighth confirmation token is received from the requesting user over an eighth communication channel. Then, it is verified that the two tokens are the same. At least one of the two communication channels should be established by means of using the further additional communication address of the request. Again, authentication is made and an association is created between the further additional communication address of the requesting communication party, the telephone communication address and the requesting communication party itself, which association serves as a basis for future authentication of the requesting communication party.

Note that the pair of communication channels, i.e. the first and second channel for the telephone communication address, the third and fourth channel for the additional communication address, etc., may comprise the same physical channel, but the two channels of each pair may also be separate. Typically, separated channels imply a higher level of security (with respect to e.g. eavesdropping) in transferring the respective tokens across the corresponding channel. Also note that the tokens delivered to the communication party, i.e. the first confirmation token, the third confirmation token, the fifth confirmation token, etc., preferably differ from each other such that confirmation tokens cannot be reused by any malicious party.

In accordance with an embodiment of the present invention, the initial measure to create an association between the telephone communication address of the user, the additional communication address of the user and the user herself is preceded by authenticating the user in conformity with the authentication method described in the above. First, the telephone communication address and the additional communication address of the user are received. Then, tokens are delivered to and received from the user in a manner as previously described, wherein the user is authenticated by means of using the telephone communication address and the additional communication address for which the association is created. Note that the communication channels used in this embodiment may be the same as the communication channels used after the association has been made. For example, a mobile telephone channel may be employed one day for establishing contact with the user by using the user's telephone communication address and an IP telephony channel may be used another day for establishing contact with the same user via the telephone communication address.

In another embodiment of the invention, the user is provided with the possibility of revoking a telephone communication address and/or a stored additional communication address. This is performed by disassociating the concerned communication address with the association in which it is comprised.

In another embodiment of the invention, the users are made aware of the telephone communication address of the party administering and managing the authentication of the user, to further increase the security of the authentication.

In yet an embodiment of the invention, the first confirmation token is distributed over a communication channel that is established using the telephone communication address. If so, the second confirmation token could either be distributed over the same telephone communication channel or over a digital network, which in a further embodiment is the Internet.

A communication channel that is established using the telephone communication address could for instance be an IP telephone communication channel, a "regular" voice telephone communication channel using for example PSTN or GSM (or some other type of mobile phone system) or a combination of the two. The confirmation tokens could then be comprised in e.g. voice messages, SMS, MMS or instant messaging messages. Confirmation tokens may be generated by means of using touch-tone signaling.

Note that the steps of electronically reauthenticating a communication party need not be performed in the order given in the method defined by the claims.

Further features of, and advantages with, the pre-sent invention will become apparent when studying the appended claims and the following description. Those skilled in the art realize that different features of the present invention can be combined to create embodiments other than those described in the following.

BRIEF DESCRIPTION OF THE DRAWINGS

A detailed description of preferred embodiments of the present invention will be given with reference made to the accompanying drawing, in which.

Corresponding elements are denoted with corresponding reference numbers in the drawings.

DETAILED DESCRIPTION OF PREFERRED EMBODIMENTS OF THE INVENTION

Figure 1:
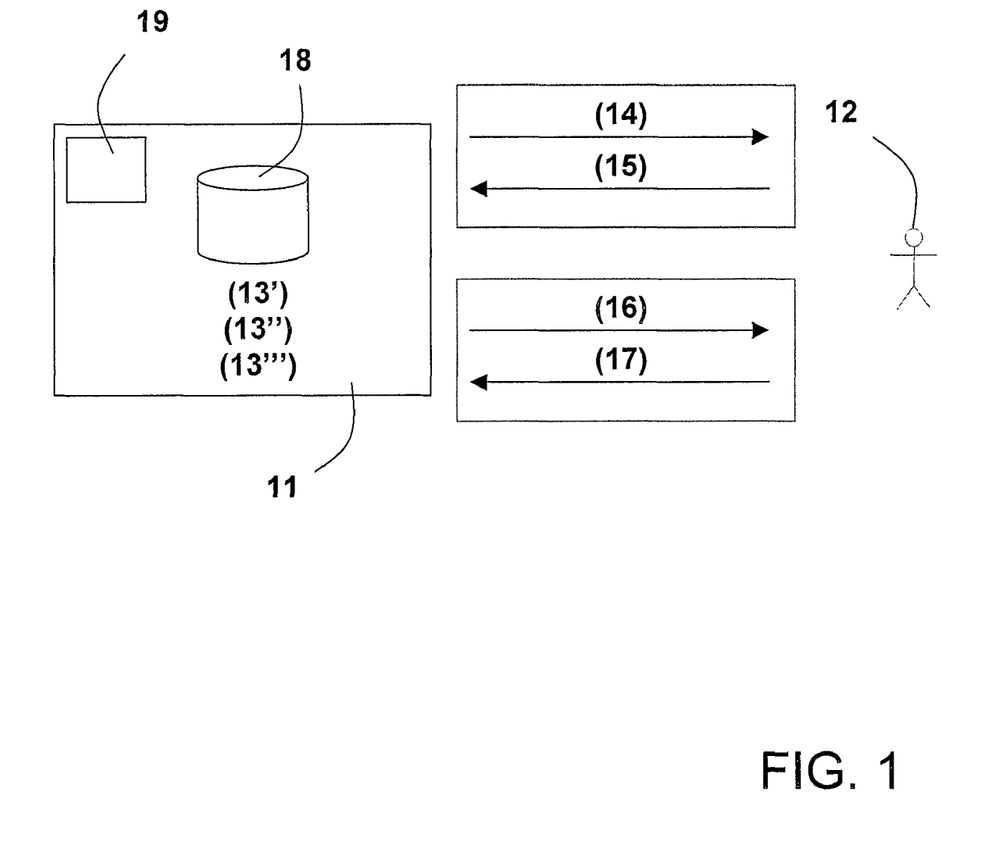
FIG. 1 illustrates the method and device in accordance with an embodiment of the present invention.

FIG. 1 illustrates how a company, an organization or other party 11 maintains and manages an electronic authentication of a user 12 over time. This is performed by associating a telephone communication address (13') with an additional communication address (13") and the user (13''') and storing the association in a storage 18. Then, it is verified that the user is in control of the telephone communication address by distributing, over a first communication channel, a first confirmation token (14) and receiving, over a second communication channel, a second confirmation token (15), where at least one of the two communication channels are established using the telephone communication address. Finally, it is analogously verified that the user is in control also of the additional communication address by distributing, over a third communication channel, a third confirmation token (16) and receiving, over a fourth communication channel, a fourth confirmation token (17), where at least one of the two communication channels is established using said additional communication address.

The steps defined in the method of the present invention is typically performed by a computer 19 at the company 11, which computer executes appropriate software for performing these steps. The customer 12 is typically remotely located from the company 11.

An example of the environment in which the present invention may be applied is given in the following.

Consider a company 11 providing a service to customers 12 over the Internet. When a customer 12 signs up for the service, the customer registers a telephone number, i.e. a telephone communication address, and an email address, i.e. an additional communication address, in a form on the Internet home page of the company. The customer is then called on the telephone number and a voice reads a code to the customer. The customer enters the code in another form on the Internet. The customer receives an e-mail with a further code, which the customer enters, which is denoted by the code, in yet another form on the Internet. Thus, in analogy with the description of FIG. 1, an initial authentication of the customer has been performed. An association between the telephone communication address, the additional communication address and the customer is created and possibly stored, which association serves as a basis for future authentication of the customer.

Figure 2:
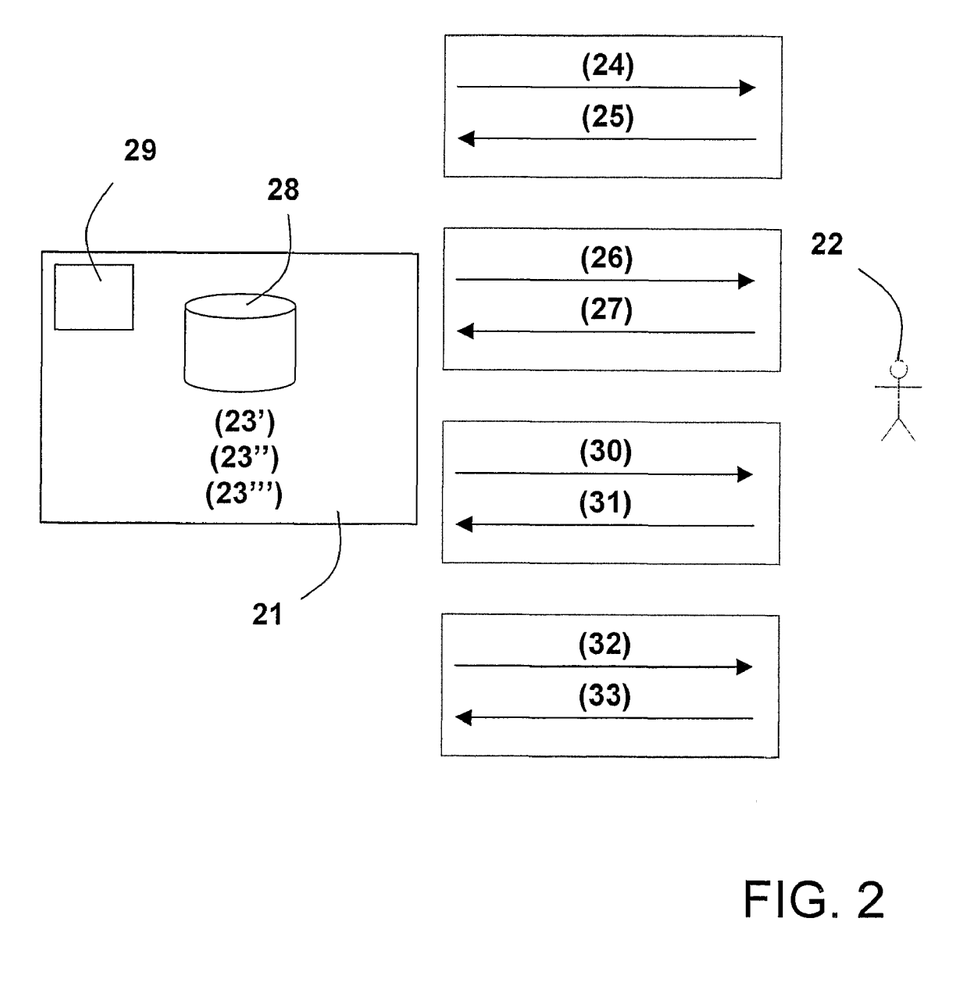
FIG. 2 illustrates the method and device in accordance with another embodiment of the present invention.

Now, reference is made to FIG. 2. Subsequently, i.e. after initial authentication has been undertaken, when the customer 22 needs to access the service and use resources that should only be available to the customer at the company 21, i.e. through using his user account, the procedure is repeated using new codes. The customer requests to access the account (and/or to create a new association comprising new communication addresses). The customer is then called on the telephone number associated with the account, a voice reads a code 24, and the customer enters the code 25 on the Internet. The customer receives an e-mail with a further code 26 and enters this further code 27 in a form on the Internet. If the codes are found to match in the two cases, the customer is granted access to the account. Consequently, an authentication of the customer has been undertaken.

The customer may also add an alternative telephone number to be used to access the account. The customer is then called on the telephone number currently used to access the account, a voice reads a code 30 and the customer enters the code 31 on the Internet. The customer receives an e-mail with a further code 32 to the e-mail address currently associated with the account and enters it 33 in a form on the Internet. If the distributed code is found to match the received code in each of the previous rounds of authentication as well as in this round of authentication, the new telephone number is accepted and associated with the user account. An additional e-mail address may be added in an analog manner.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for electronic reauthentication of a communication party, said method comprising:
creating and storing an association between a telephone communication address of the communication party, an additional communication address of the communication party and the communication party itself;
receiving a request, which includes a request to create an association for a further additional communication address, from a requesting communication party;
verifying that a stored association exists for the requesting communication party;
distributing, over a first communication channel, a first confirmation token to the requesting communication party;
receiving, over a second communication channel, a second confirmation token from the requesting communication party, wherein at least one of the first and the second channel is established by using the telephone communication address of the association for the requesting communication party;
verifying correspondence between the first confirmation token and the second confirmation token;
distributing, over a third communication channel, a third confirmation token to the requesting communication party;
receiving, over a fourth communication channel, a fourth confirmation token from the communication party, wherein at least one of the third and the fourth channel is established by using an additional communication address of the association for the requesting communication party;
verifying correspondence between the third confirmation token and the fourth confirmation token, wherein the requesting communication party is considered to be authenticated if one of the correspondence between the first confirmation token and the second confirmation token and the correspondence between the third confirmation token and the fourth confirmation token is found to match;
distributing, over a fifth communication channel, a fifth confirmation token to the requesting communication party;
receiving, over a sixth communication channel, which is separate from the fifth communication channel, a sixth confirmation token from the requesting communication party, wherein one of the fifth and the sixth channel is established by using said further additional communication address included in the request;
verifying correspondence between the fifth confirmation token and the sixth confirmation token; and
if the correspondence between the fifth confirmation token and the sixth confirmation token is found to match, creating and storing an association between said further additional communication address of the requesting communication party, said telephone communication address and the requesting communication party itself.

2. The method according to claim 1, wherein creating an association between said further telephone communication address of the requesting communication party, said additional communication address and the requesting communication party itself is preceded by:
receiving the telephone communication address and the additional communication address of the communication party;
distributing, over a seventh communication channel, a seventh confirmation token to the communication party;
receiving, over an eighth communication channel, an eighth confirmation token from the communication party, wherein at least one of the seventh and the eighth channel is established by using the telephone communication address;
verifying correspondence between the seventh confirmation token and the eighth confirmation token;
distributing, over a ninth communication channel, a ninth confirmation token to the communication party;
receiving, over a tenth communication channel, a tenth confirmation token from the communication party, wherein at least one of the ninth and the tenth channel is established by using the additional communication address; and verifying correspondence between the ninth confirmation token and the tenth confirmation token.

3. The method according to claim 1, further comprising:
revoking a telephone communication address by disassociating the telephone communication address with the association thereof.

4. The method according to claim 1, further comprising:
revoking an additional communication address by disassociating the additional communication address with the association thereof.

5. The method according to claim 1, further comprising:
informing the communication party of a telephone communication address of a party with which the communication party authenticates itself, wherein the channels which may be established by using the telephone communication address of the association for the requesting communication party both are telephone communication channels, and where at least one of the two communication channels is established by using said telephone communication address of the party with which the communication party authenticates itself.

6. The method according to claim 1, wherein any communication channel arranged to be established via the telephone communication address, over which a confirmation token is delivered to a communication party, is included in at least one of a public switched telephone network, a mobile telephone network, and an IP telephone network.

7. The method according to claim 1, wherein any communication channel arranged to be established via the telephone communication address, over which a confirmation token is received from a communication party, is included in at least one of a public switched telephone network, a mobile telephone network, and an IP telephone network.

8. The method according to claim 1, wherein any communication channel arranged to be established via the telephone communication address, over which a confirmation token is delivered to a communication party, is included in the Internet.

9. The method according to claim 1, wherein any communication channel arranged to be established via the telephone communication address, over which a confirmation token is received from a communication party, is included in the Internet.

10. The method according to claim 1, wherein any communication channel arranged to be established via the additional communication address, over which a confirmation token is delivered to a communication party, is included in the Internet.

11. The method according to claim 1, wherein any communication channel arranged to be established via the additional communication address, over which a confirmation token is received from a communication party, is included in the Internet.

12. The method according to claim 1, wherein any confirmation token distributed over a communication channel arranged to be established via the telephone communication address is included in a voice message.

13. The method according to claim 1, wherein any confirmation token received over a communication channel arranged to be established via the telephone communication address is included in a voice message.

14. The method according to claim 1, wherein any confirmation token distributed over a communication channel arranged to be established via the telephone communication address is generated by using touch-tone signaling.

15. The method according to claim 1, wherein any confirmation token received over a communication channel arranged to be established via the telephone communication address is generated by using touch-tone signaling.

16. The method according to claim 1, wherein any confirmation token distributed over a communication channel arranged to be established via the telephone communication address is included in at least one of an SMS message, an MMS message and an instant messaging message.

17. The method according to claim 1, wherein any confirmation token received over a communication channel arranged to be established via the telephone communication address is included in at least one of an SMS message, an MMS message and an instant messaging message.

18. The method according to claim 1, wherein any confirmation token distributed over a communication channel arranged to be established via the additional communication address is included in at least one of an SMS message, an MMS message and an instant messaging message.

19. The method according to claim 1, wherein any confirmation token received over a communication channel arranged to be established via the additional communication address is included in at least one of an SMS message, an MMS message and an instant messaging message.

20. The method according to claim 1, further comprising: storing the associations that are created.

21. A computer program product comprising a non-transitory computer useable medium having computer readable program codes embodied in the medium that, when executed on a computer, cause the computer to carry out the method as claimed in claim 1.

22. A device for electronically reauthenticating a communication party, said device comprising:
a first creating/storing device for creating and storing an association between a telephone communication address of the communication party, an additional communication address of the communication party and the communication party itself;
a first receiving device for receiving a request, which includes a request to create an association for a further additional communication address, from a requesting communication party;
a first verifying device, via a processor, for verifying that stored association exists for the requesting communication party;
a first distributing device for distributing, over a first communication channel, a first confirmation token to the requesting communication party;
a second receiving device for receiving, over a second communication channel, a second confirmation token from the requesting communication party, wherein at least one of the first and the second channel is established by using the telephone communication address of the association for the requesting communication party;
a second verifying device, via the processor, for verifying correspondence between the first confirmation token and the second confirmation token;
a second distributing device for distributing, over a third communication channel, a third confirmation token to the requesting communication party;
a third receiving device for receiving, over a fourth communication channel, a fourth confirmation token from the communication party, wherein at least one of the third and the fourth channel is established by using an additional communication address of the association for the requesting communication party;
a third verifying device, via the processor, for verifying correspondence between the third confirmation token and the fourth confirmation token, wherein the requesting communication party is considered to be authenticated if one of the correspondence between the first confirmation token and the second confirmation token and the correspondence between the third confirmation token and the fourth confirmation token is found to match;

a third distributing device for distributing over a fifth communication channel, a fifth confirmation token to the requesting communication party;

a fourth receiving device for receiving, over a sixth communication channel, which is separate from the fifth communication channel, a sixth confirmation token from the requesting communication party, wherein one of the fifth and the sixth channel is established by using said further additional communication address included in the request;

a fourth verifying device, via the processor, for verifying correspondence between the fifth confirmation token and the Sixth confirmation token; and a second creating/storing device for creating and storing an association between said further additional communication address of the requesting communication party, said telephone communication address and the requesting communication party itself, if the correspondence between the fifth confirmation token and the sixth confirmation token is found to match.

23. The device according to claim 22, further comprising:
a fifth receiving device for receiving the telephone communication address and the additional communication address of the communication party;
a fourth distributing device for distributing, over a seventh communication channel, a seventh confirmation token to the communication party;
a sixth receiving device for receiving, over an eighth communication channel, an eighth confirmation token from the communication party, wherein at least one of the seventh and the eighth channel is established by using the telephone communication address;
a fifth verifying device, via the processor, for verifying correspondence between the seventh confirmation token and the eighth confirmation token;
a fifth distributing device for distributing, over a ninth communication channel, a ninth confirmation token to the communication party;
a seventh receiving device for receiving, over a tenth communication channel, a tenth confirmation token from the communication party, wherein at least one of the ninth and the tenth channel is established by using the additional communication address; and
a sixth verifying device, via the processor, for verifying correspondence between the ninth confirmation token and the tenth confirmation token.

24. The device according to claim 22, further comprising:
a revoking device for revoking a telephone communication address by disassociating the telephone communication address with the association thereof.

25. The device according to claim 22, further comprising:
a revoking device for revoking an additional communication address by disassociating the additional communication address with the association thereof.

26. The device according to claim 22, further comprising:
an informing device for informing the communication party of a telephone communication address of a party with which the communication party authenticates itself, wherein the channels which be established by using the telephone communication address of the association for the requesting communication party both are telephone communication channels, and where at least one of the two communication channels is established by using said telephone communication address of the party with which the communication party authenticates itself.

27. The device according to claim 22, wherein any communication channel arranged to be established via the telephone communication address, over which a confirmation token is delivered to a communication party, is included in at least one of a public switched telephone network, a mobile telephone network, and an IP telephone, network.

28. The device according to claim 22, wherein any communication channel arranged to be established via the telephone communication address, over which a confirmation token is received from a communication party, is included in at least one of a public switched telephone network, a mobile telephone network, and an IP telephone network.

29. The device according to claim 22, wherein any communication channel arranged to be established via the telephone communication address, over which a confirmation token is delivered to a communication party, is included in the Internet.

30. The device according to claim 22, wherein any communication channel arranged to be established via the telephone communication address, over which a confirmation token is received from a communication party, is included in the Internet.

31. The device according to claim 22, wherein any communication channel arranged to be established via the additional communication address, over which a confirmation token is delivered to a communication party, is included in the Internet.

32. The device according to claim 22, wherein any communication channel arranged to be established via the additional communication address, over which a confirmation token is received from a communication party, is included in the Internet.

33. The device according to claim 22, further comprising:
a voice message generating device for generating a voice message to be distributed as a confirmation token over a communication channel arranged to be established via the telephone communication address.

34. The device according to claim 22, further comprising:
a voice message receiving device for receiving a voice message as a confirmation token over a communication channel arranged to be established via the telephone communication address.

35. The device according to claim 22, further comprising:
a touch-tone signal generating device for generating a touch-tone signal to be distributed as a confirmation token over a communication channel arranged to be established via the telephone communication address.

36. The device according to claim 22, further comprising:
a touch-tone signal receiving device for receiving a touch-tone signal as a confirmation token over a communication channel arranged to be established via the telephone communication address.

37. The device according to claim 22, further comprising:
a message generating device for generating an SMS message, an MMS message or an instant messaging message to be distributed as a confirmation token over a communication channel arranged to be established via the telephone communication address.

38. The device according to claim 22, further comprising:
a message receiving device for receiving an SMS message, an MMS message or an instant messaging message as confirmation token over a communication channel arranged to be established via the telephone communication address.

39. The device according to claim 22, further comprising:
a message generating device for generating an SMS message, an MMS message or an instant messaging message to be distributed as a confirmation token over a communication channel arranged to be established via the additional communication address.

40. The device according to claim 22, further comprising:
a message receiving device for receiving an SMS message, an MMS message or an instant messaging message as a confirmation token over a communication channel arranged to be established via the additional communication address.

41. The device according to claim 22, further comprising:
a storing device for storing the associations that are created.

\* \* \* \* \*

UNITED STATES PATENT AND TRADEMARK OFFICE
CERTIFICATE OF CORRECTION

PATENT NO. : 8,302,175 B2  
APPLICATION NO. : 11/918877  
DATED : October 30, 2012  
INVENTOR(S) : Thoursie et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this
Fifth Day of August, 2014

Michelle K. Lee
*Deputy Director of the United States Patent and Trademark Office*